United States Patent
Ko et al.

(10) Patent No.: US 10,904,823 B2
(45) Date of Patent: Jan. 26, 2021

(54) BASE STATION DEVICE AND TERMINAL DEVICE

(75) Inventors: Young-Jo Ko, Daejeon (KR); Jae Young Ahn, Daejeon (KR); Jae Heung Kim, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 934 days.

(21) Appl. No.: 12/429,741

(22) Filed: Apr. 24, 2009

(65) Prior Publication Data

US 2009/0268669 A1 Oct. 29, 2009

(30) Foreign Application Priority Data

Apr. 25, 2008 (KR) .................. 10-2008-0038831
Apr. 17, 2009 (KR) .................. 10-2009-0033704

(51) Int. Cl.
*H04W 48/08* (2009.01)
*H04J 11/00* (2006.01)
*H04W 88/08* (2009.01)
*H04W 88/02* (2009.01)

(52) U.S. Cl.
CPC ......... *H04W 48/08* (2013.01); *H04J 11/0069* (2013.01); *H04W 88/02* (2013.01); *H04W 88/08* (2013.01)

(58) Field of Classification Search
USPC ........................................................ 370/328
See application file for complete search history.

(56) References Cited

U.S. PATENT DOCUMENTS

| | | | |
|---|---|---|---|
| 2005/0169289 A1 | 8/2005 | Sebire et al. | |
| 2008/0013516 A1* | 1/2008 | Zhang et al. | .................. 370/342 |
| 2008/0043702 A1* | 2/2008 | Moon | .................. H04J 11/0069 |
| | | | 370/342 |
| 2008/0095108 A1* | 4/2008 | Malladi | .................. H04B 1/713 |
| | | | 370/329 |
| 2008/0161036 A1 | 7/2008 | Tu et al. | |

(Continued)

FOREIGN PATENT DOCUMENTS

| | | |
|---|---|---|
| JP | 2005-51647 | 2/2005 |
| KR | 10-0567313 | 4/2006 |

(Continued)

OTHER PUBLICATIONS

NPL document, TS 36.304 v8.1.0 (Mar. 2008), Technical Specification Group Radio Access Network; Evolved Universal Terrestrial Radio Access (E-UTRA); User Equipment (UE) procedures in idle mode, (hereinafter TS36.304).*

*Primary Examiner* — Gregory B Sefcheck
*Assistant Examiner* — Majid Esmaeilian

(57) ABSTRACT

Disclosed are a base station device and a terminal device. The base station device includes a signal generator to generate a synchronization channel signal based on the cell type of a cell that the base station device manages, and a transmitter to transmit the synchronization channel signal via a synchronization channel established between at least one terminal device and the base station device, wherein the cell type is classified based on the information of the scale of the cell and whether the cell selectively allows access. The terminal may quickly recognize the cell type in a cellular wireless communication system having a hierarchical cell structure.

15 Claims, 4 Drawing Sheets

(56) References Cited

U.S. PATENT DOCUMENTS

| | | | | |
|---|---|---|---|---|
| 2008/0267153 | A1* | 10/2008 | Mukherjee et al. | 370/338 |
| 2009/0086672 | A1* | 4/2009 | Gholmieh et al. | 370/329 |
| 2009/0135803 | A1* | 5/2009 | Luo et al. | 370/350 |
| 2009/0239533 | A1* | 9/2009 | Somasundaram | H04J 11/0093 455/434 |
| 2012/0046056 | A1* | 2/2012 | Luo | H04J 11/005 455/502 |

FOREIGN PATENT DOCUMENTS

| | | |
|---|---|---|
| KR | 10-2006-0050565 | 5/2006 |
| KR | 10-0695828 | 3/2007 |
| KR | 10-2008-0016159 | 2/2008 |

* cited by examiner

BASE STATION DEVICE AND TERMINAL DEVICE

CROSS-REFERENCE TO RELATED APPLICATION

This application claims the benefit under 35 U.S.C. § 119(a) of a Korean Patent Application Nos. 10-2008-0038831, filed on Apr. 25, 2008 and 10-2009-0033704, filed on Apr. 17, 2009, in the Korean Intellectual Property Office, the entire disclosure of which is incorporated herein by reference.

BACKGROUND

1. Field

The following description relates to a base station device and a terminal device, and more particularly, to a base station device and a terminal device that is enabled to recognize the cell type in a cellular wireless communication system.

2. Description of Related Art

A cellular wireless communication system may provide wireless communication service based on a hierarchical cell structure that is arranged by arranging a large scale cell, such as a macrocell, and a small scale cell, such as a micro cell, a femtocell, and the like.

Unlike the large scale cell used for managing a relatively large spatial area and used for supporting a user terminal moving at a low or high speed, the small scale cell is used for supporting a user terminal moving in a relatively small spatial area, such as an office, a house, a store, a school, and the like, at a low speed such as less than 3 km/h. Therefore, the large scale cell and the small scale cell may provide wireless communication service using different frames with different structures, and different pilot signals with different patterns from each other.

Also, a small scale cell may define a closed subscriber group (CSG) to allow a predetermined user terminal group to access, and may allow only those user terminals that have registered for the CSG of the cell to access and receive wireless communication service.

Accordingly, in order to effectively provide wireless communication service, it is desirable that the user terminal quickly recognize, when performing the initial cell search or the neighbor cell search, whether an adjacent cell is a large scale cell or a small scale cell and whether the CSG is applied to the cell if the adjacent cell is a small scale cell

SUMMARY

In one general aspect, there is provided a base station device and a terminal device that is enabled to recognize the cell type in a cellular wireless communication system.

According to example embodiments, there may be provided a base station device, including a signal generator to generate a synchronization channel signal based on the cell type of a cell that the base station device manages, and a transmitter to transmit the synchronization channel signal via a synchronization channel established between at least one terminal device and the base station device, wherein the cell type is classified based on the information of the scale of the cell and whether the cell selectively allows access.

In this case, a plurality of synchronization channel sequences assigned to the synchronization channel are grouped into a plurality of synchronization channel sequence groups, one group of the plurality of synchronization channel sequence groups corresponds to one cell type, and the signal generator generates the synchronization channel signal using a synchronization channel sequence in the synchronization channel sequence group corresponding to the cell type.

Also, the synchronization channel signal comprises a primary synchronization channel signal and a secondary synchronization channel signal, the signal generator performs phase modulation of secondary synchronization channel sequence assigned to the synchronization channel, and also generates the secondary synchronization channel signal using the phase modulated secondary channel sequence.

According to other example embodiments, there may be provided a base station device, including a signal generator to generate a broadcast channel signal including information about the cell type of a cell that the base station manages, and a transmitter to transmit the broadcast channel signal via a broadcast channel established between at least one terminal device and the base station device, wherein the cell type is classified based on the information of the scale of the cell and whether the cell selectively allows access.

According to example embodiments, there may be provided a terminal device, including a receiver to receive a synchronization channel signal via a synchronization channel established between a base station device and the terminal device, and a recognizer to recognize, using the synchronization channel signal, the cell type of a cell that the base station device manages, wherein the cell type is classified based on the information of the scale of the cell and whether the cell selectively allows access.

In this case, a plurality of synchronization channel sequences assigned to the synchronization channel are grouped into a plurality of synchronization channel sequence groups, and the recognizer restores a synchronization channel sequence from the synchronization channel signal and determines which of the plurality of synchronization channel sequence groups includes the restored synchronization channel sequence.

Also, the receiver receives a primary channel signal and a secondary channel signal, and the recognizer restores a primary channel sequence from the primary channel signal and compares a phase of the primary channel sequence with a phase of the secondary channel sequence to recognize the cell type.

According to other example embodiments, there may be provided a terminal device, including a receiver to receive a broadcast channel signal via a broadcast channel established between a base station device and the terminal device, and a recognizer to recognize, using the broadcast channel signal, the cell type of a cell that the base station manages. Here, the broadcast channel signal includes information about the cell type, and the cell type is classified based on the information of the scale of the cell and whether the cell selectively allows access.

Other features and aspects will be apparent from the following detailed description, the drawings, and the claims.

Figure 1:
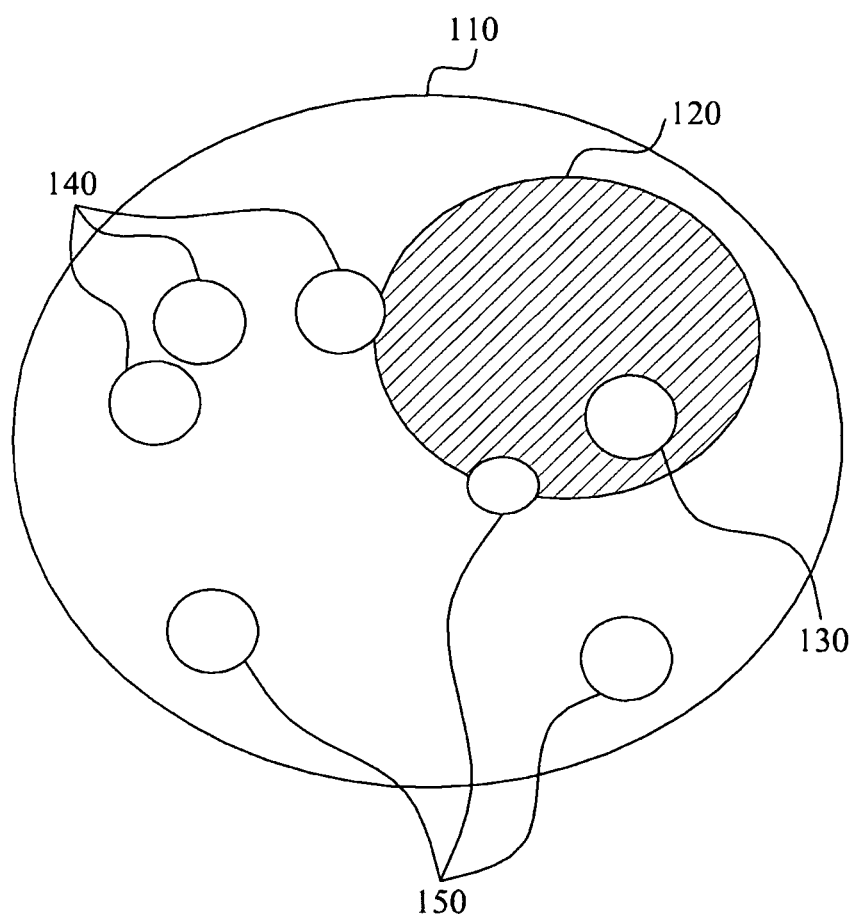
FIG. 1 illustrates an example of a hierarchical cell structure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of a hierarchical cell structure.

A 4th generation (4G) cellular wireless communication system may provide wireless communication service using the hierarchical cell structure as illustrated in FIG. 1.

In the cellular communication service, a macrocell 110 is deployed preferentially to obtain overall cell coverage, and then a microcell 120, a Home Node-B 130, a Home eNode-B 140, and a Relay Node 150 which cover a relatively small spatial area are arranged to be layered with the macrocell 110.

The Home Node-B 130, the Home eNode-B 140, and the Relay Node 150 are small-scale cells discussed in the Third Generation Partnership Project (3GPP) that standardizes a cellular wireless communication standard. Particularly, the Home Node-B 130 is a cell used for wideband code division multiple access (WCDMA), the Home eNode-B 140 is a cell used for 3GPP Long Term Evolution (LTE), the Relay Node 150 is a cell having a wireless backhaul link, deployed to increase the base station coverage or the spectral efficiency. Hereinafter, the Home Node-B 130, the Home eNode-B 140, and the Relay Node 150 are referred to as a small-scale cell.

The large scale cell and the small scale cell may provide wireless communication service using different frames and channels having different structures and different pilot signals having different patterns, and a small scale cell may only allow a user terminal, which has registered for the closed subscriber group (CSG) of the cell, to access the cell.

Figure 2:
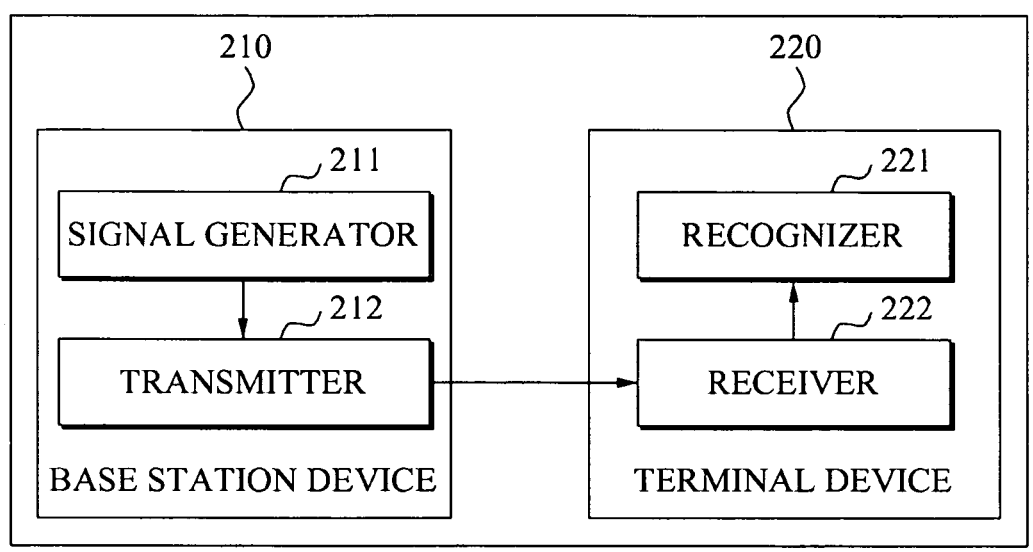
FIG. 2 is a block diagram illustrating an example of a detailed configuration of a cellular wireless communication system.

FIG. 2 is a block diagram illustrating an example of a detailed configuration of a cellular wireless communication system 200.

The cellular wireless communication system 200 according to example embodiments may include a base station 210 and a terminal device 220. Also, according to example embodiments, the base station device 210 includes a signal generator 211 and a transmitter 212, and the terminal device 220 includes a recognizer 221 and a receiver 222. Hereinafter, a function of each element will be described in detail.

In general, the terminal device 220 performs cell search during an initial service period of the wireless communication service or when an event such as handover occurs. Accordingly, the time that the terminal uses for the cell search may need to be reduced to provide seamless wireless communication service.

As described in the above, the structure of the frame and channels and the pilot patterns may be different depending on the scale of the cell, and also whether or not the cell uses selective access may be determined based on whether the CSG is applied to the cell. Accordingly, if the cell type of a neighboring cell can be recognized during the cell search, the time that the terminal spends for the cell search can be reduced and the system information appropriate for each cell type can be obtained.

According to example embodiments, the cellular wireless communication system 200 may control the terminal device 220 to recognize the cell type using at least one of a synchronization channel signal and a broadcast channel signal.

Here, the cell type is classified based on the information about the scale of the cell and whether the cell selectively allows accessing.

As an example, the cell type is classified into a large scale or small scale cell depending on the scale of the cell. Also, when the cell is a small scale cell, the cell type may be classified into a Home Node-B 130, a Home eNode-B 140, and a Relay Node 150 as described in FIG. 1.

Also, when the cell is a small scale cell, the cell type is classified into a cell that allows a predetermined user terminal group to access, namely, the cell where the CSG is applied, or a cell that allows all user terminals to access, namely, the cell where the CSG is not applied.

Hereinafter, an example of the operation of the base station device 210 and the terminal device 220 for recognizing the cell type will be described.

Hereinafter, recognition of cell type using a synchronization channel signal is described.

Prior to describing the example embodiments, synchronization channel signal will be briefly described as below.

In general, the primary synchronization channel (PSCH) signal and the secondary synchronization channel (SSCH) signal are used for synchronization and cell ID acquisition in the 3GPP LTE system. The PSCH signal may be used for obtaining the cell ID and synchronization between the base station device 210 and the terminal device 220, and the SSCH signal may be used for obtaining the radio frame synchronization and the cell ID that the base station device 210 manages.

The PSCH signal may be generated by using any one PSCH sequence of the three PSCH sequences, and SSCH signal may be generated by using one SSCH sequence of the 168 SSCH sequences. Accordingly, there are 504 different synchronization channel sequences and signals.

The cellular wireless communication system 200 according to example embodiments may recognize the cell type using a synchronization channel signal including the PSCH signal and the SSCH signal.

The base station device 210 generates the synchronization channel signal based on the cell type of a cell that the base station device 210 manages, and may transmit the generated synchronization channel signal to the terminal device 220. The synchronization signal is generated from the signal generator 211, and the generated synchronization channel signal is transmitted from the transmitter 212.

The synchronization channel signal generated from the signal generator 211 includes information for recognizing the cell type, since the synchronization channel signal is generated based on the cell type. Hereafter the information for recognizing the cell type is referred to as cell type recognition information. Accordingly, the terminal device 220 that receives the synchronization channel signal may recognize the cell type using the synchronization channel signal. The synchronization channel signal may be received by a receiver 222, and the cell type is recognized by a recognizer using the received synchronization channel signal.

The base station device 210 and the terminal device 220 may share the cell type recognition information, and the terminal 220 may recognize the cell type using the shared cell type recognition information and the received synchronization signal.

A procedure of generating the synchronization signal based on the cell type will be described in detail.

First, according to example embodiments, a plurality of synchronization channel sequences assigned to a synchronization channel are grouped into a plurality of synchronization channel sequence groups, and the base station device 210 may generate a synchronization channel signal using the first synchronization channel sequence in a synchronization channel sequence group corresponding to a particular cell type.

That is, the base station device 210 may generate the synchronization channel signal using a synchronization channel sequence in the synchronization channel sequence group corresponding to the cell type of a cell that the base station device 210 manages among the plurality of synchronization channel sequence groups classified according to the cell types, and may transmit the generated synchronization channel signal to the terminal device 220.

The terminal device 220 that receives the synchronization channel signal restores a synchronization channel sequence from the synchronization channel signal, and recognizes the cell type by determining which of the plurality of the synchronization sequence groups includes the restored synchronization channel sequence based on the shared cell type recognition information. The synchronization channel sequence is restored in the recognizer 221 included in the terminal device 220.

As an example, when there are 504 synchronization channel sequences, and the cell type is classified into two types, namely, CSG cells where CSG is applied and non-CSG cell where CSG is not applied, the synchronization channel sequences are grouped into the first synchronization channel sequence group including first 252 synchronization channel sequences and the second synchronization channel sequence group including remaining 252 synchronization channel sequences.

Here, when a cell that the base station device 210 manages is a CSG cell where CSG is applied, the base station device 210 may generate the synchronization channel signal using a synchronization channel sequence in the first synchronization channel sequence group, and may transmit the generated synchronization channel signal to the terminal 220.

The terminal device 220 that receives the synchronization channel signal may restore the synchronization channel sequence from the synchronization channel signal. In this case, since the information of the grouped synchronization channel sequence group may be shared between the base station device 210 and the terminal device 220, the terminal device 220 may recognize that the restored synchronization channel sequence is the synchronization channel sequence included in the first synchronization channel sequence group. Accordingly, the terminal device 220 may recognize the cell type of a cell that the base station 210 manages is the type of the cell where the CSG is applied.

Also, according to other example embodiments, a synchronization channel signal includes a PSCH signal and a SSCH signal, and the signal generator 211 included in the base station device 210 performs phase modulation of a SSCH sequence assigned to a synchronization channel and generates the SSCH signal using the phase modulated SSCH sequence. The generated SSCH signal is transmitted to the terminal device 220 together with the PSCH signal. In this case, the signal generator 211 may control phase modulation according to cell type.

The terminal device 220 that receives the PSCH signal and the SSCH signal restores a PSCH sequence from the PSCH signal, restores the SSCH sequence from the SSCH signal, and recognizes the cell type by comparing a phase of the restored PSCH sequence with a phase of the restored SSCH sequence. Restoring of the synchronization channel sequence and recognizing of the cell type is performed by the recognizer 221 included in the terminal device 220.

That is, the terminal device 220 may recognize the cell type by checking the phase modulation of the restored SSCH sequence based on the restored PSCH sequence.

In this case, the base station device 210 and the terminal device 220 may share the cell type dependence on the phase modulation.

According to example embodiments, the base station 210 may modulate the SSCH sequence using the binary phase shift keying (BPSK) method, and may generate the PSCH signal and the SSCH signal using a PSCH sequence that is not phase modulated, and may generate a phase modulated SSCH sequence and transmit the generated PSCH signal and SSCH signal.

The terminal device 220 that receives the synchronization channel signal recognizes the cell type by comparing the phase of the PSCH sequence with the phase of the SSCH sequence which is restored from the synchronization channel signal. In this case, since the BPSK method is used, the terminal device 220 may recognize a maximum of two cell types.

As an example, the terminal device 220 recognizes the cell type as a large scale cell when a modulation information value of one bit included in the SSCH signal is '0', and recognizes the cell type as a small scale cell when a modulation information value of the one bit is '1'. As another example, the terminal device 220 recognizes the cell type as CSG cell when a modulation information value of the one bit is '0', and recognizes the cell type as non-CSG cell when a modulation information value of the one bit is '1'.

According to other example embodiments, the base station device 210 modulates a SSCH sequence using the quadrature phase shift keying (QPSK) method, generates the PSCH signal and the SSCH signal using a PSCH sequence that is not phase modulated and a phase modulated SSCH sequence, and transmits the generated PSCH signal and SSCH signal to the terminal device 220. In this case, the terminal device 220 that receives the synchronization channel may recognize a maximum of four cell types.

As an example, the terminal device 220 may recognize the cell type as a large scale cell when a modulation information value of two bits included in the SSCH signal is '00', recognizes the cell type as a Home Node-B when the modulation information value of the two bit is '01', recognizes the cell type as a Home eNode-B when the modulation information value of the two bit is '10', and recognizes the cell type as a Relay Node when the modulation information value of the two bit is '11'.

Hereinafter, recognition of the cell types using a broadcast channel signal is described.

The cellular wireless communication system 200 according to other example embodiments may recognize the cell types using a broadcast channel signal.

The base station device 210 may generate a broadcast channel signal including information with respect to the cell type of a cell that the base station device 210 manages, and may transmit the generated broadcast channel signal to the terminal device 220 via a broadcast channel. The broadcast channel signal is generated in a signal generator 211, and the generated broadcast channel signal is transmitted from the transmitter 212.

The terminal device 220 that receives the broadcast channel signal may recognize the cell type using the information with respect to the cell type included in the broadcast channel signal. The broadcast channel signal is received by the receiver 222, and the cell type is recognized by the recognizer 221 using the broadcast channel signal. The base station device 210 and the terminal device 220 may share cell type recognition information. A relationship between a number of additional bits (b) for expressing information with respect to the cell type and a number of recognizable cell types (c) is represented as "$c=2^b$".

If the cell type is recognized by using the broadcast channel signal, the information about the cell type may be obtained fast in the physical layer. For the purpose of fast recognition of the cell type, the cellular wireless communication system 200 may have the broadcast channel signal containing the information about the cell type as a separate channel.

In this case, the location of the broadcast channel signal in the frame, the constitution of the broadcast channel signal, the pattern of the pilot signal for receiving the broadcast channel signal, and the like may be equally applied to all the cells, and thus the terminal device 220 may receive the broadcast channel signal regardless of the cell type.

The methods described above may be used independently or may be used as a combination of more than two methods.

Figure 3:
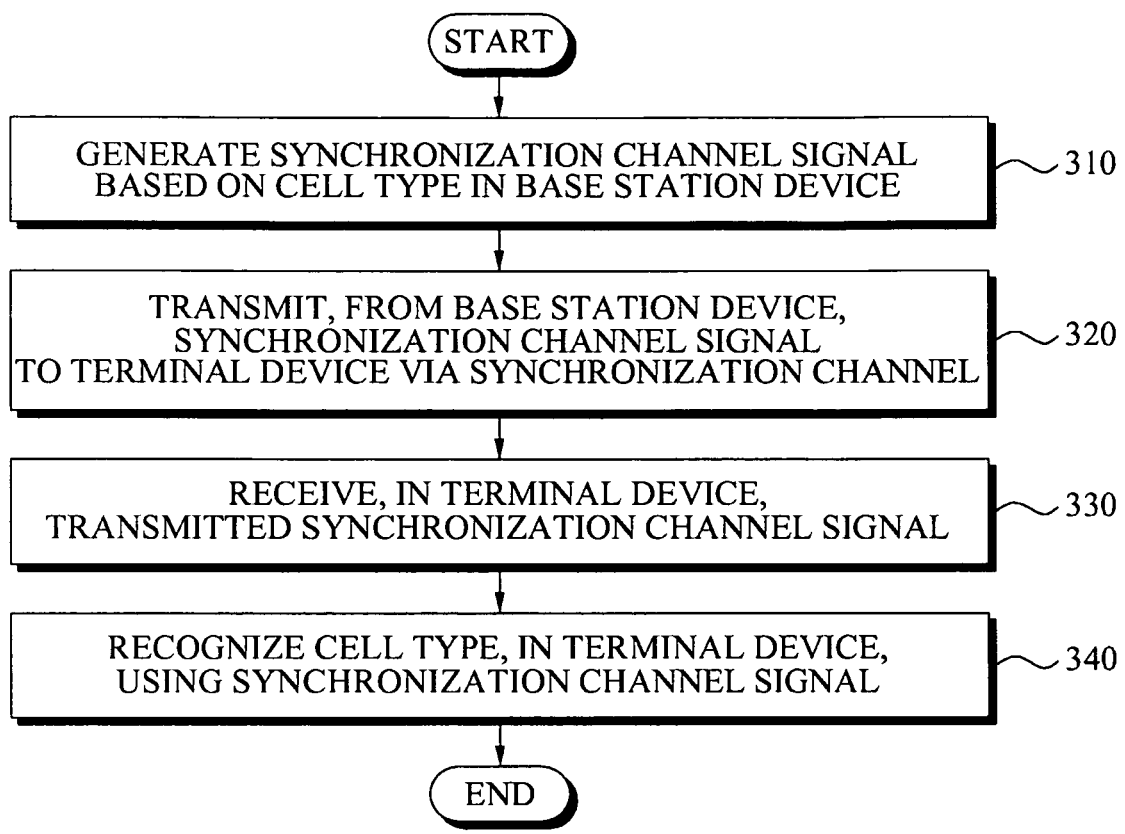
FIG. 3 is a flowchart illustrating a method of recognizing the cell type using a synchronization channel signal in a cellular wireless communication system.
Figure 4:
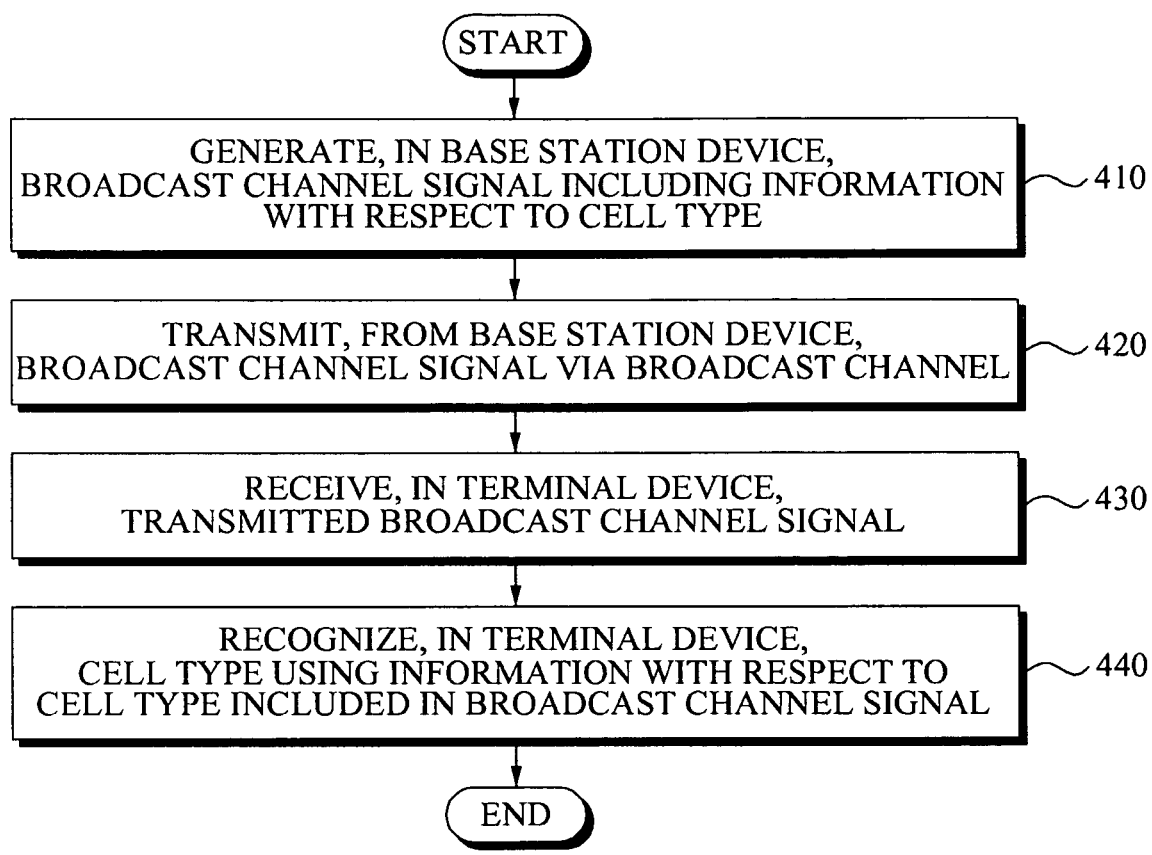
FIG. 4 is a flowchart illustrating a method of recognizing the cell type using a broadcast channel signal in a cellular wireless communication system.

FIGS. 3 and 4 are flowcharts illustrating a method of recognizing the cell type in a cellular wireless communication system. Hereinafter, each procedure will be described in detail.

FIG. 3 is a flowchart illustrating a method of recognizing the cell type using a synchronization channel signal in a cellular wireless communication system.

First, the base station device generates a synchronization channel signal based on the cell type.

Here, the cell type is classified based on the information of the scale of the cell and whether the cell selectively allows access.

Also, according to example embodiments, a plurality of synchronization channel sequences assigned to a synchronization channel is grouped into a plurality of synchronization channel sequence groups, and any one synchronization channel sequence group among the plurality of synchronization channel sequence groups corresponds to one cell type. In operation 310, the synchronization channel signal may be generated by using a synchronization channel sequence in the synchronization channel sequence group corresponding to the cell type.

Also, according to other example embodiments, a synchronization channel signal includes a PSCH signal and a SSCH signal, and in operation 310, a SSCH sequence assigned to a synchronization channel is phase modulated and a SSCH signal is generated by using the phase modulated SSCH sequence.

In this instance, the phase modulation is any one of binary phase shift keying (BPSK) method and a quadrature phase shift keying (QPSK).

In operation 320, the base station device transmits the synchronization channel signal to a terminal device via the synchronization channel.

In operation 330, the terminal device receives the synchronization channel signal.

In operation 340, the terminal device recognizes the cell type using the synchronization channel signal.

According to example embodiments, in operation 340, the synchronization channel sequence is restored from the synchronization channel signal, and the cell type is recognized by determining which of the plurality of synchronization channel sequence groups includes the restored synchronization channel sequence.

Also, according to other example embodiments, in operation 340, the PSCH sequence is restored from the PSCH signal, the SSCH sequence is restored from the SSCH signal, and the cell type is recognized by comparing a phase of the PSCH sequence with a phase of the SSCH sequence. In this instance, as described above, the SSCH sequence may be phase modulated by using any one of the BPSK method and the QPSK.

FIG. 4 is a flowchart illustrating a method of recognizing the cell type using a broadcast channel signal in a cellular wireless communication system.

First, in operation 410, a base station device generates the broadcast channel signal including information about the cell type.

Here, the cell type is classified based on the information of the scale of the cell and whether the cell selectively allows access.

In operation S420, the base station device transmits the broadcast channel signal to a terminal device via a broadcast channel.

In operation 430, the terminal device receives the broadcast channel signal.

In operation 440, the terminal device recognizes the cell type using information about the cell type included the broadcast channel signal.

A few example embodiments of the cell type recognition method in a cellular wireless communication system have been shown and described, and a configuration of the cellular wireless communication system described in FIG. 2 is applicable to the present example embodiment. Accordingly, detailed descriptions thereof will be omitted.

The method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method by a user equipment, the method comprising:
   receiving, at the user equipment, a first primary synchronization signal from a first cell;
   receiving, at the user equipment, a first secondary synchronization signal from the first cell;
   determining, at the user equipment, a first cell identifier based on the first primary synchronization signal and the first secondary synchronization signal;
   receiving, at the use equipment, cell type recognition information from the first cell, wherein the cell type recognition information indicates a first group of cell identifiers related to closed subscriber group (CGS) cells;
   determining, at the user equipment, whether or not the first cell is a CSG cell based on the cell type recognition information and the first cell identifier;
   receiving, at the user equipment, a second primary synchronization signal from a second cell;
   receiving, at the user equipment, a second secondary synchronization signal from the second cell;
   determining, at the user equipment, a second cell identifier based on the second primary synchronization signal and the second secondary synchronization signal; and
   determining, at the user equipment, whether or not the second cell is a CSG cell based on the cell type recognition information and the second cell identifier.

2. The method of claim 1, wherein the first primary synchronization signal, the first secondary synchronization signal, the second primary synchronization signal, and the second secondary synchronization signal are transmitted from a base station.

3. The communication method of claim 2, wherein the cell identifiers in the first group are determined by the base station.

4. The method of claim 1, further comprising:
   determining that the first cell identifier belongs to the first group of cell identifiers related to CSG cells;
   determining that the first cell is a CSG cell based on a determination that the first cell identifier belongs to the first group of cell identifiers related to the CSG cells; and
   determining that the first cell selectively allows access based on a determination that the first cell is a CSG cell.

5. The communication method of claim 1, wherein the first cell belongs to both the first group and the second group.

6. An apparatus for a user equipment, the apparatus comprising:
   a circuitry,
   wherein the circuitry is configured to:
   cause the user equipment to receive a first primary synchronization signal from a first cell;
   cause the user equipment to receive a first secondary synchronization signal from the first cell;
   determine a first cell identifier based on the first primary synchronization signal and the first secondary synchronization signal;
   cause the user equipment to receive cell type recognition information from a first cell, wherein the cell type recognition information indicates a first group of cell identifiers related to closed subscriber group (CSG) cells;
   determine whether or not the first cell is a CSG cell based on the cell type recognition information and the first cell identifier;
   cause the user equipment to receive a second primary synchronization signal from a second cell;
   cause the user equipment to receive a second secondary synchronization signal from the second cell;
   determine a second cell identifier based on the second primary synchronization signal and the second secondary synchronization signal; and
   determine whether or not the second cell is a CSG cell based on the cell type recognition information and the second cell identifier.

7. The apparatus of claim 6, wherein the first primary synchronization signal, the first secondary synchronization signal, the second primary synchronization signal, and the second secondary synchronization signal are transmitted from a base station.

8. The apparatus of claim 7, wherein the cell identifiers in the first group are determined by the base station.

9. The apparatus of claim 6, wherein the circuitry is further configured to:
   determine that the first cell identifier belongs to the first group of cell identifiers related to CSG cells;
   determine that the first cell is a CSG cell based on a determination that the first cell identifier belongs to the first group of cell identifiers related to the CSG cells; and
   determine that the first cell selectively allows access based on a determination that the first cell is a CSG cell.

10. The apparatus of claim 6, wherein the first cell belongs to both the first group and the second group.

11. A user equipment, comprising:
    a circuitry,
    wherein the circuitry is configured to:
    cause the user equipment to receive a first primary synchronization signal from the first cell;
    cause the user equipment to receive a first secondary synchronization signal from the first cell;
    determine a first cell identifier based on the first primary synchronization signal and the first secondary synchronization signal;
    cause the user equipment to receive cell type recognition information from a first cell, wherein the cell type recognition information indicates a first group of cell identifiers related to closed subscriber group (CSG) cells;
    determine whether or not the first cell is a CSG cell based on the cell type recognition information and the first cell identifier;
    cause the user equipment to receive a second primary synchronization signal from a second cell;
    cause the user equipment to receive a second secondary synchronization signal from the second cell;
    determine a second cell identifier based on the second primary synchronization signal and the second secondary synchronization signal; and
    determine whether or not the second cell is a CSG cell based on the cell type recognition information and the second cell identifier.

12. The user equipment of claim 11, wherein the first primary synchronization signal, the first secondary synchronization signal, the second primary synchronization signal, and the second secondary synchronization signal are transmitted from a base station.

13. The user equipment of claim 12, wherein the cell identifiers in the first group are determined by the base station.

14. The user equipment of claim 11, wherein the circuitry is further configured to:
- determine that the first cell identifier belongs to the first group of cell identifiers related to CSG cells;
- determine that the first cell is a CSG cell based on a determination that the first cell identifier belongs to the first group of cell identifiers related to the CSG cells; and
- determine that the first cell selectively allows access based on a determination that the first cell is a CSG cell.

15. The user equipment of claim 11, wherein the first cell belongs to both the first group and the second group.

* * * * *